Figures 1, 2, 3, 8:
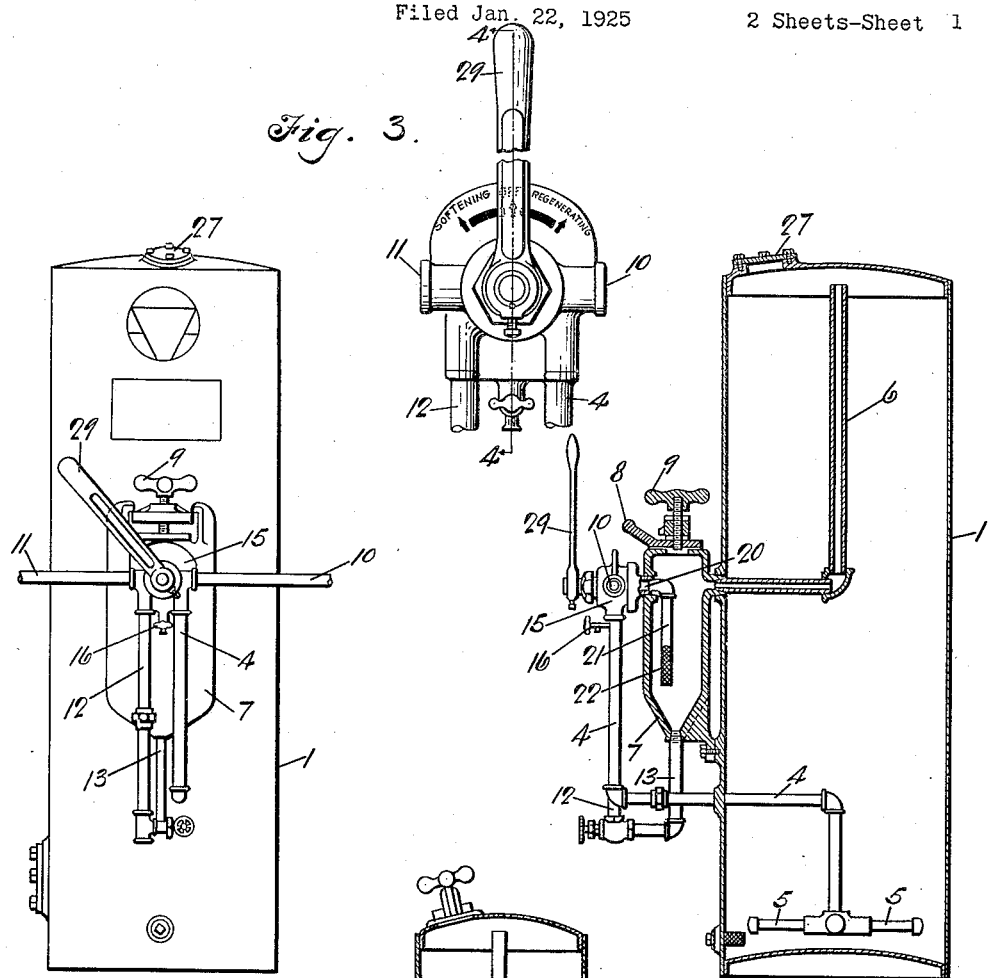

Dec. 18, 1928.

C. P. EISENHAUER 1,695,541

WATER SOFTENER VALVE

Filed Jan. 22, 1925    2 Sheets-Sheet 2

Inventor
Charles P. Eisenhauer
By J. L. Walker
Attorney

Patented Dec. 18, 1928.

1,695,541

UNITED STATES PATENT OFFICE.

CHARLES P. EISENHAUER, OF DAYTON, OHIO.

WATER-SOFTENER VALVE. REISSUED

Application filed January 22, 1925. Serial No. 3,951.

My invention relates to water softening devices and more particularly to chemical softeners, wherein the active materials are periodically revived or restored by washing in reverse direction to remove impurities. Such washing or cleansing being ordinarily effected by use of salt brine.

The ordinary installation requires a rather complicated plumbing system of conduits and independently operated valves in order to direct the flow of water from the source of supply in one direction thru the filter bed and then into the service or distribution line, and in reverse direction thru the bed and into a waste outlet, with necessary pet cocks for testing the condition of the water during different stages of operation. Inasmuch as such water softening devices are installed in residences the care and responsibility of operation involving the opening and closing of a number of independent valves is too great for the ordinary householder who may not understand the theory and principle of operation. The present invention is intended to overcome these difficulties by providing a circulation system under control of a single valve operable to different positions, which may be plainly marked so that the unskilled person may operate the softener to change the circuitory system from operating condition to regenerating or recharging condition and vice versa, with no chance of mistake. To this end the present invention embodies a tank or main chamber containing a filter bed of water softening material, thru which the water ordinarily enters the bottom and passes out at the top. During regeneration, however, water is admitted at the top of such tank and above the filter bed, and is withdrawn from the bottom. Therefore, the tank or compartment is provided with conduits leading to the top and bottom of such compartment or tank, which are alternately employed as inlets or outlet conduits, to be alternately connected with a supply conduit from a source of water supply under pressure. The other of the tank conduits is connected with the service or distribution conduit during normal operation and being connected with the outlet or waste conduit during the regeneration period. This alternation of connection is effected by a single rotary control valve, having multiple ports and chambers effecting the interconnection of the several conduits in different relations by different adjustments of such valves. This control valve is further provided with test cock which is in constant communication with the flow of water, whichever may be its direction, so that the test cock will discharge water after it has passed the bed of filter material, whichever its direction of flow may be. When the valve is in one direction the test cock will supply water from the top of the compartment or tank, during the normal softening period of operation, while in reverse position of the valve, during the regeneration period, the test cock will supply water from the bottom of the tank. Thus only a single valve and single test cock are necessary, the connection of the test cock being reversed with the reversal of the conduit connection by the adjustment of the valve. The construction and operation being thus simplified, the control and operation of the softening and filter system is within the ability and skill of the ordinary householder, who need not know the theory of operation, but who is required merely to turn the valve from one position to the other, at regular intervals.

The object of the invention is to simplify the structure as well as the means and mode of operation of water softeners and filters, whereby they will not only be cheapened in construction, but will be more efficient in use, positive in operation, uniform in action easily controlled and unlikely to get out of repair.

A further and primary object of the invention is to provide a universal control of the various circuits and conduits comprising the softener and filter system, whereby such systems may be controlled by a person unskilled and without knowledge of the theory of operation, with no danger of becoming confused, and wherein it will be impossible for such person to make wrong or improper adjustments.

A further object of the invention is to provide an improved system of interconnection between the water supply conduit and distribution conduit in a water softener or filter system and to further provide an improved form of control valve common to a plurality of conduits comprising such system.

With the above primary and other incidental objects in view as will more fully appear in the specification, the invention consists of the features of construction, the parts and combinations thereof and the mode of operation, or their equivalents as hereinafter described and set forth in the claims.

Figure 5:
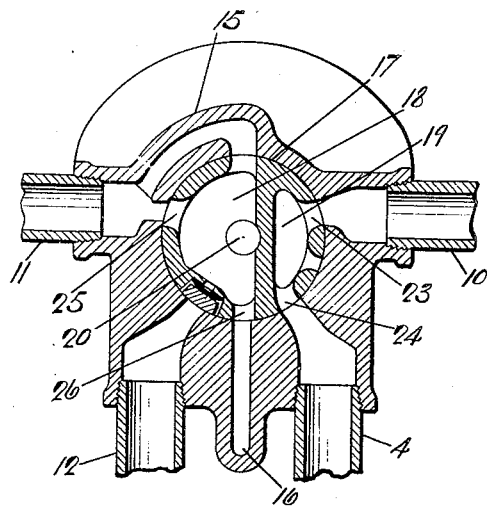
Figure 6:
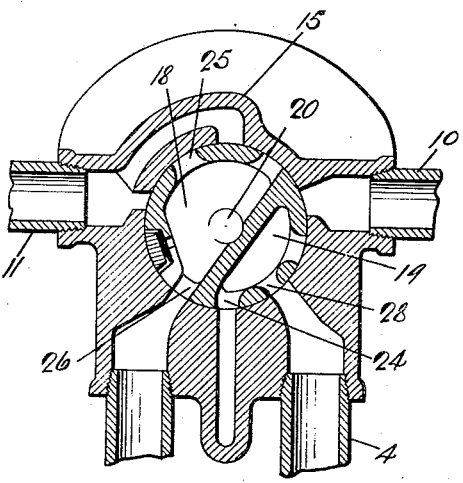
Figure 7:
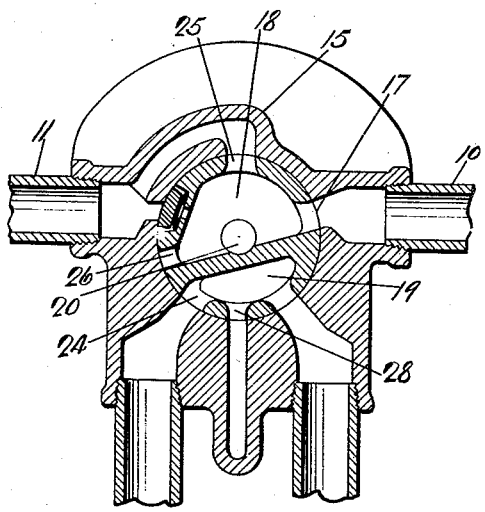
Figure 4:
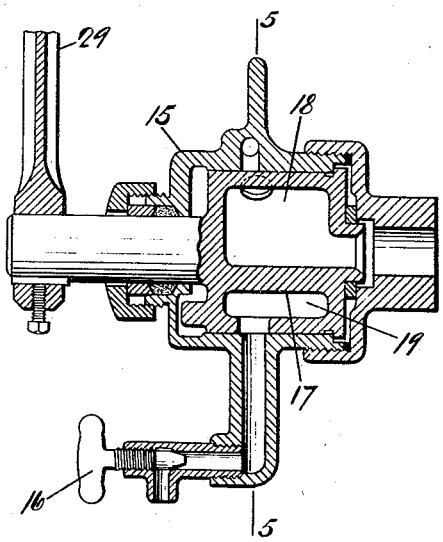

Referring to the accompanying drawings, Fig. 1 is a front view and Fig. 2 a vertical sectional view of an assembled water softener or filter, embodying the present features of invention. Fig. 3 is an enlarged front elevation of the universal control valve and Fig. 4 is a longitudinal sectional view on line 4—4 of Fig. 3. Figs. 5, 6 and 7 are detail sectional views on lines 5—5 of Fig. 4, showing the valve in different positions of adjustment, that shown in Fig. 5 being the normal or softening position, Fig. 6 showing the intermediate or off position, in which pressure is received from the tank preparatory to regeneration. Fig. 7 shows the valve positioned for regeneration or for cleansing and revival of the filtering and softening body. Fig. 8 is a sectional view of the apparatus from which the salt pot has been omitted.

Like parts are indicated by similar characters of reference thruout the several views.

Referring to the accompanying drawings, wherein is shown the preferred, but obviously, not necessarily the only form of embodiment of the invention, 1 indicates the tank or filter chamber, in the bottom of which is preferably placed a quantity of gravel 2, on which is superposed the body 3 of zeolite or other chemical purifier and softener. Discharging into the lower portion of the tank or compartment 1 preferably into the substratum of gravel is a conduit 4, having perforated distributing arms 5. In the normal softening and filter operations, the water discharged thru the conduit 4 and distributing head 5 passes upward thru the superposed body of filtering and softening material and is withdrawn from the top of the tank or compartment thru a conduit 6. The conduit 6 extends exteriorly of the tank, but for improvement of the appearance of the softener it is wholly enclosed, extending downwardly thru the body 3 of the softening and filtering material, and thence laterally thru the wall of the tank at a mid-height point. While the conduit 4 is normally employed as the inlet conduit, and the conduit 6 as the outlet for the filtered and softened water, during the regeneration or rejuvenation period, salt water brine is introduced into the tank or compartment 1, thru the conduit 6 and is allowed to percolate downwardly thru the body 3 of filtering and softening material and withdrawn from the bottom of the tank or compartment thru the conduit 4. Thus the flow direction is reversed.

To provide convenient means for introducing the salt brine for rejuvenation purposes and to afford a settling chamber in which may be collected any sand or particles carried thru the outlet conduit 6 from the tank or compartment, and to prevent their conduct into the distribution system, there is provided on the side of the tank or compartment 1, an auxiliary chamber or salt pot 7, with which the conduit 6 communicates. The salt pot 7 has a removable closure lid 8, which may be hermetically sealed by means of the pressure screw 9. Leading to the apparatus is a water supply conduit 10, leading from any source of supply under pressure, such as a city distribution system. Leading from the apparatus is a service conduit or distribution line, conducting the softened water to various parts of the house. In addition to the supply and service conduits, there is also provided a waste conduit 12, preferably connected with the sewer or other disposal outlet. From the bottom of the salt pot 7 there extends an auxiliary waste conduit 13, which communicates with the waste disposal conduit 12. The auxiliary conduit 13 is for the purpose of draining the salt pot permitting the pot to be charged with salt for regeneration. In lieu of providing such control valve for the several conduits to open and close in certain combinations to effect the active softening operation and the rejuvenation operation, there is provided in the present instance a single universal valve common to all of the conduits. The use of a single valve having multiple connections enables a person unacquainted with the circuitory system and the theory of operation to change the apparatus from softening to regeneration and vice versa without danger of mistake and with minimum effort by the oscillation of a single control lever. The universal valve comprises a valve housing 15, located preferably on the front wall of the salt pot 7. This housing 15 has oppositely disposed lateral connection for the supply conduit 10 and the service or distribution conduit 11, and also connections at its bottom for a tank conduit 4 and the waste disposal conduit 12. Intermediate the last named conduit at the bottom of the housing, there is provided a test cock 16, which in all positions of the valve is in constant communication with the interior of the tank or compartment 1, and by the reversal of the common control valve such test cock is alternately connected with the bottom and top of the tank to test the water after it has passed in either direction thru the body of filtering and softening material. Located in the housing 15 is a rotary barrel 17, divided into non-communicating chambers 18 and 19 and provided with a plurality of radially disposed ports brought into registry with the different conduit orifices in the valve housing with which the respective conduits communicate. The rotary barrel 17 is provided with a concentric orifice 20, in its inner end, which is in constant communication with the tank or compartment 1, thru the salt pot 7. Within the salt pot 7 is a dependent conduit 21, directly connected to the port 20 of the valve and extending downwardly within the salt pot terminating in a screen or filter head 22.

In the normal or softening position of the valve, the chamber 19 forms an intercommunicating passage from the supply conduit 10 to the tank inlet conduit 4. In this adjustment as shown in Fig. 5 the port 23 of the rotary valved barrel is in registry with the orifice of the inlet conduit 10 while the port 24 registers with the orifice of the tank conduit 4. At the same time the port 20 communicating with the tank 1 thru the salt pot and conduit 6 is in communication with the service or distribution conduit 7 through the radial port 25, which is in registry therewith. The water to be softened is thus introduced into the inlet conduit 10 passing through the chamber 19 and the tank conduit 4, into the lower portion of the tank 1, where it is circulated from the distribution head 5 upwardly through the body 3 of material to the top of the tank from which it is drained through the conduit 6, into the auxiliary or salt pot 7 where any entrained particles of sand or foreign material are deposited. The water passes thence through the strainer head 22 and conduit 21, to the port 20, which at all times is in communication with the chamber 18 of the valve barrel, from which it passes from the port 25 to the distribution or service line. At such time the orifice to the waste disposal conduit 12 is closed, but the test cock 16 is in communication with the chamber 18, through an auxiliary port 26 in the valve barrel. Thus at any time by opening the test cock 16 a sample of water may be drawn from the top of the tank after such water has passed thru the filter body. When it is found that the zeolite or other chemical filter body is not affording to the water the proper degree of softening or in other words is not removing from the water the desired portion of alkaline constituents, the filter body is cleansed and rejuvenated by the circulation of salt brine therethru in reverse direction. In passing from the active softening position to the regenerating or rejuvenating position, the valve passes a neutral or intermediate "off" position. In this position, both the supply conduit 10, and service or distribution conduit 11 are disconnected while the port 20 communicating with the salt pot 7 and conduit 6 to the top of the tank is in direct communication with the waste disposal conduit 12. This allows the escape of the surplus water from the top of the tank and relieves the pressure, allowing the salt pot to be opened for a charge of common salt to effect the rejuvenation of the filter bed. In the event the auxiliary chamber or salt pot 7 is not employed as may be the case, the salt charge may be introduced thru the hand hole 27 in the top of the tank. During this off or charging position the test cock 16 is in communication with the bottom of the tank or compartment thru the port 24 which is brought into registry with the test cock passage by the partial rotation of the barrel and the intermediate port 28 in the chamber 19, which by the partial rotation is brought into registry with the orifice of the tank conduit 4. The salt pot 7 or tank 1 being charged with the necessary quantity of salt the valve barrel is rotated to its opposite limit of movement by the hand lever 29, thereby opening the chamber 18 of the valve barrel to the inlet or supply conduit orifice 10, while maintaining the service or distribution conduit 11 closed. This allows the inflowing water from the supply conduit 10 to pass into the chamber 18 to pass into the barrel and thence thru the port 20 into the salt pot 7, where the salt is dissolved and the solution or brine is carried thru the conduit 6 from the salt pot to the top of the tank 1 overflowing the extremity of the conduit onto the bed 3 of filter material.

This cleansing and rejuvenating salt solution percolates thru the filter bed 3 and is collected by the perforated head 5 at the bottom of the tank and conducted thence thru the tank conduit 4 to the chamber 19 of the valve barrel, which in the regenerating position of the valve is in communication with such tank conduit 4 thru the port 23, while at the same time the port 24 of such compartment is in registry with the waste disposal conduit 12. The saline solution drained from the bottom of the tank is thus conducted thru the conduit 4 and the intercommunicating valve chamber 19 to the waste conduit 12 thru which it is discharged into the sewer or other waste disposal. During this position of the valve the test cock 16 is in communication with the valve chamber 19 thru the intermediate port 28, registering therewith, so that the water or solution being conducted from the tank may be tested from time to time to ascertain the stage of rejuvenation, and to determine whether or not the saline solution is entirely eliminated. When the filter bed 3 has been properly and thoroughly cleansed and restored to its active softening characteristics, and the saline solution is eliminated, the control valve is returned to its normal or softening position as shown in Fig. 5 by reversal of the lever 29, thereby causing the water supply to enter the tank 1 at the bottom thereof thru the conduit 4 and passed upward thru the filter bed leaving the tank thru the conduit 6 and thence thru the port 20 of the control valve to the service or distribution conduit 11.

If the rotary valve barrel 17 is closely and accurately fitted within the casing 15, there will be no leakage. When the valve is in operating or softening position, shown in Fig. 5, there is high pressure in all conduits and both valve chambers, except in the waste conduit 12, and there might be leakage in a badly fitted valve from the port 26 to the waste conduit 12. To obviate such leakage, a seal plug 30 is provided which is seated in a recess in the valve barrel 17, and is urged against the port 24 by a spring 31. In addition to spring pressure, the sealing plug 30 is subjected to water pressure upon its inner side through the small opening 32. Thus the waste port 24 is effectually closed against the high pressure developed within the valve barrel. Obviously, such seal plug may be entirely omitted if the valve is otherwise made leak-tight.

In order that water may be supplied to the distribution lines for emergency use during the regeneration period, an auxiliary bypass 33 is provided. This bypass is not an essential feature, but will be found desirable and a convenience. The conduits 4 and 6 may extend exteriorly of the tank entering the tank adjacent the top and bottom thereof, but for improved appearance are extended interiorly as shown in the drawing. In Fig. 8 there is shown a modification wherein the salt pot 7 has been omitted and the control valve connected directly to the conduit 6 leading into the tank. In this construction the hand hole cover 27 is removed from the top of the tank and the salt charge is entered directly into the top of the tank, which is first drained and the pressure relieved by turning the valve to "off" position. It will be noted that the test cock is connected alternately to the top and bottom of the tank by the reversal of the valve.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the staute, the invention has been described in language more or less specific as to structural features, it is to be understood that the invention is not limited to the specific details shown, but that the means and construction herein disclosed comprises the preferred form of several modes of putting the invention into effect and the invention is, therefore, claimed in any of its forms within the scope of the appended claims.

Having thus described my invention, I claim:

1. In a water softener, a tank, conduits alternately employed as inlet and outlet conduits leading to the top and bottom of the tank, a supply conduit, a service conduit and a waste conduit, and a rotary valve common to all of said conduits, by the adjustment of which the water flow from said service pipe may be directed thru the tank inlet and outlet conduits in one direction and thence thru the service pipe or thru such tank inlet and outlet conduits in the opposite direction and thence thru the waste conduit or to entirely disconnect said service conduit.

2. In a water softener, a tank, separate conduits communicating with the tank and alternately employed for inlet and outlet purposes, a supply conduit, a service conduit and a waste conduit, and a control valve which when in one position of adjustment connects the supply conduit thru the tank inlet and outlet conduits with the service conduit and when in reverse position connects the supply conduit thru the tank inlet and outlet conduits in reverse relation with the waste conduit or to entirely disconnect said service conduit.

3. In a water softener, a tank, conduits extending into proximity with the top and bottom of the tank respectively and alternately employed for inlet and outlet purposes, a supply conduit, a service conduit and a waste conduit and a valve for connecting the supply conduit alternately with the respective tank communicating conduits and simultaneously connecting said tank conduits alternately with the service and waste conduits or to entirely disconnect said service conduit.

4. In a water softener, a tank, a regenerating chamber, a conduit connecting the regenerating chamber with the top of the tank, a supply conduit discharging into the lower portion of the tank, and a service conduit communicating with the regenerating chamber, and a valve operating to cut off the service conduit and open the supply conduit to the regenerating chamber and open the bottom of the tank to waste or to entirely disconnect said service conduit.

5. In a water softener a tank having spaced inlet and outlet connections, a supply conduit, a service conduit and a waste connection, and common valve adapted to reverse the flow from one supply conduit thru the tank to the service conduit and waste connections respectively or to entirely disconnect said service conduit.

6. In a water softener, a tank, a supply conduit, a service conduit and a waste connection, and a common control valve which when in one position will direct the water flow from the supply conduit thru the tank to the service conduit and when in reverse position will direct the flow in reverse direction from the supply conduit to the waste connection or to entirely disconnect said service conduit.

7. In a water softener, a tank, a supply conduit, a service conduit and a waste connection, and a common control valve which when in one position will direct the water flow from the supply conduit thru the tank to the service conduit and when in reverse position will direct the flow in reverse direction from the supply conduit to the waste connection and disconnect said service conduit, and further adapted to connect the tank direct with the waste while disconnecting both the supply and service conduits in a third position of said common valve.

8. In a water softener, a tank having inlet and outlet connections, a supply conduit, a service conduit and a waste connection, a common valve for connecting the supply conduit at will thru the tank with the service conduit or reversely thru the tank with the waste connection or to entirely disconnect said service conduit, and a drain cock common to both courses of flow.

9. In a water softener, a tank having inlet and outlet connections, a supply conduit, a service conduit and a waste connection, a common valve for connecting the supply conduit at will thru the tank with the service conduit or reversely thru the tank with the waste connection or the tank directly to the waste independent of connection to the service conduit or supply conduit, and a drain cock operative in all positions of said valve.

In testimony whereof, I have hereunto set my hand this 2nd day of January, A. D. 1925.

CHARLES P. EISENHAUER.